(12) United States Patent
Gibson et al.

(10) Patent No.: US 9,937,640 B2
(45) Date of Patent: Apr. 10, 2018

(54) APPARATUS AND METHOD FOR CLOSURE OF OPHTHALMIC LENS MOLDS

(71) Applicant: CooperVision International Holding Company, LP, St. Michael (BB)

(72) Inventors: John Robert Gibson, Farnham Common (GB); Geoffrey Douglas Sydney Payne, Bolton (GB); Terence Michael Cook, Norwich (GB)

(73) Assignee: CooperVision International Holding Company, LP, St. Michael (BB)

( * ) Notice: Subject to any disclaimer, the term of this patent is extended or adjusted under 35 U.S.C. 154(b) by 525 days.

(21) Appl. No.: 14/576,234

(22) Filed: Dec. 19, 2014

(65) Prior Publication Data

US 2016/0176071 A1 Jun. 23, 2016

(51) Int. Cl.
- B29D 11/00 (2006.01)
- B29C 33/20 (2006.01)
- B29C 43/58 (2006.01)

(52) U.S. Cl.
CPC ........ B29C 33/20 (2013.01); B29D 11/00125 (2013.01); B29D 11/00519 (2013.01); B29D 11/00951 (2013.01); B29C 43/58 (2013.01); B29C 2043/5808 (2013.01); B29C 2043/5833 (2013.01)

(58) Field of Classification Search
CPC ........ B29D 11/00125; B29D 11/00519; B29D 11/00951; B29C 33/20
See application file for complete search history.

(56) References Cited

U.S. PATENT DOCUMENTS

| 5,160,749 A | 11/1992 | Fogarty |
| 5,238,388 A | 8/1993 | Tsai |
| 5,466,147 A | 11/1995 | Appleton et al. |
| 5,540,410 A | 7/1996 | Lust et al. |
| 5,540,543 A | 7/1996 | Lust et al. |
| 5,545,366 A | 8/1996 | Lust et al. |
| 5,681,138 A | 10/1997 | Lust et al. |

(Continued)

FOREIGN PATENT DOCUMENTS

| DE | 2909110 A1 | 9/1980 |
| DE | 29723514 U1 | 10/1998 |

(Continued)

OTHER PUBLICATIONS

International Preliminary Report on Patentability issued in corresponding International Patent Application No. PCT/GB2015/054052 dated Mar. 16, 2017 (8 pages).

(Continued)

Primary Examiner — Mathieu Vargot
(74) Attorney, Agent, or Firm — Kilyk & Bowerso, P.L.L.C.

(57) ABSTRACT

Apparatus and methods for manufacturing ophthalmic lenses by bringing together a pair of mold halves to form a closed mold assembly, are described. The method includes measuring a force applied to bring the mold halves together. The apparatus includes at least one force sensor in operative communication with a single pair of mold halves, and a controller for controlling a velocity of movement of a mold half and for determining when a measured force or average measured force is greater than or equal to a predetermined threshold force.

19 Claims, 1 Drawing Sheet

(56) References Cited

U.S. PATENT DOCUMENTS

| | | |
|---|---|---|
| 5,702,735 A | 12/1997 | Martin et al. |
| 5,716,540 A | 2/1998 | Matiacio et al. |
| 5,776,514 A | 7/1998 | Wu et al. |
| 5,837,314 A | 11/1998 | Beaton et al. |
| 5,850,107 A | 12/1998 | Kindt-Larsen et al. |
| 5,861,114 A | 1/1999 | Roffman et al. |
| 5,928,682 A | 7/1999 | Janca et al. |
| 5,938,988 A | 8/1999 | Lust et al. |
| 5,975,875 A | 11/1999 | Crowe, Jr. et al. |
| 5,980,184 A | 11/1999 | Lust et al. |
| 5,981,618 A | 11/1999 | Martin et al. |
| 6,007,229 A | 12/1999 | Parnell, Sr. et al. |
| 6,079,940 A | 6/2000 | Lust et al. |
| 6,176,669 B1 | 1/2001 | Lust et al. |
| 6,180,032 B1 | 1/2001 | Parnell, Sr. et al. |
| 6,180,033 B1 * | 1/2001 | Greshes ............... B29C 43/203 264/1.32 |
| 6,186,736 B1 | 2/2001 | Lust et al. |
| 6,368,522 B1 | 4/2002 | Ansell et al. |
| 6,405,993 B1 | 6/2002 | Morris |
| 6,444,145 B1 | 9/2002 | Clutterbuck |
| 6,502,009 B1 | 12/2002 | Parnell, Sr. et al. |
| 6,511,617 B1 | 1/2003 | Martin et al. |
| 6,592,356 B1 | 7/2003 | Lust et al. |
| 6,732,993 B2 | 5/2004 | Dean |
| 6,752,581 B1 | 6/2004 | Lust et al. |
| 6,827,325 B2 | 12/2004 | Hofmann et al. |
| 6,830,712 B1 | 12/2004 | Roffman et al. |
| 7,156,638 B2 | 1/2007 | Lust et al. |
| 7,156,641 B2 | 1/2007 | Ansell et al. |
| 7,516,937 B2 | 4/2009 | Hofmann et al. |
| 7,585,167 B2 | 9/2009 | Lawton et al. |
| 7,811,483 B2 | 10/2010 | Witko |
| 7,935,280 B2 | 5/2011 | Lawton et al. |
| 8,038,912 B2 | 10/2011 | Beebe et al. |
| 8,105,070 B2 | 1/2012 | Reynolds et al. |
| 8,221,659 B2 | 7/2012 | Beebe et al. |
| 8,287,269 B2 | 10/2012 | Dubey et al. |
| 2005/0167038 A1 | 8/2005 | Torris et al. |
| 2006/0145369 A1 | 7/2006 | Lawton et al. |
| 2006/0145370 A1 | 7/2006 | Lawton et al. |
| 2006/0145372 A1 | 7/2006 | Jones et al. |
| 2007/0052117 A1 | 3/2007 | Arnet et al. |
| 2007/0267765 A1 | 11/2007 | Ansell et al. |
| 2008/0102151 A1 | 5/2008 | Perez et al. |
| 2008/0185744 A1 * | 8/2008 | Hovey ................. B29C 35/02 264/1.32 |
| 2010/0201009 A1 | 8/2010 | Bruce et al. |
| 2010/0289161 A1 | 11/2010 | Yamada et al. |
| 2011/0089586 A1 * | 4/2011 | Biel .................... B29C 37/005 264/1.1 |
| 2014/0103552 A1 | 4/2014 | Nakahashi et al. |

FOREIGN PATENT DOCUMENTS

| | | |
|---|---|---|
| EP | 0339642 A2 | 11/1989 |
| EP | 0882560 A2 | 12/1998 |
| EP | 0888871 A1 | 1/1999 |
| EP | 0919352 A1 | 6/1999 |
| EP | 1561560 A1 | 8/2005 |
| EP | 1752280 A2 | 2/2007 |
| EP | 1752281 A2 | 2/2007 |
| EP | 1545865 B1 | 1/2008 |
| GB | 2191144 A | 12/1987 |
| JP | 04361010 A | 12/1992 |
| JP | 08300425 A | 11/1996 |
| WO | 2000059713 A1 | 10/2000 |
| WO | 2001074574 A2 | 10/2001 |
| WO | 2008039485 A1 | 4/2008 |
| WO | 2008078395 A1 | 7/2008 |

OTHER PUBLICATIONS

International Search Report and Written Opinion issued in corresponding International Patent Application No. PCT/GB2015/054052 dated Mar. 4, 2016 (15 pages).

Search and Examination Report issued in corresponding United Kingdom Patent Application No. 1422766.4 dated Jun. 19, 2015 (5 pages).

* cited by examiner

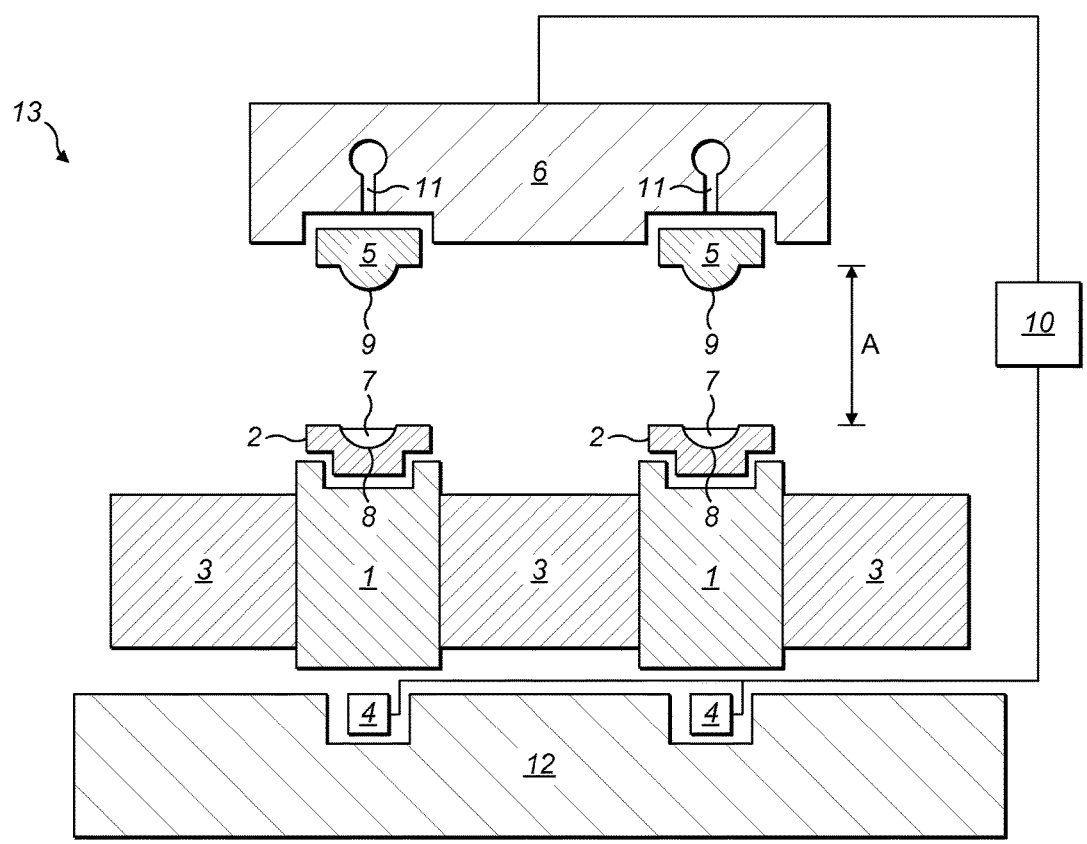

APPARATUS AND METHOD FOR CLOSURE OF OPHTHALMIC LENS MOLDS

FIELD

The present disclosure relates to apparatus and methods for manufacturing ophthalmic lenses, particularly for closing, and optionally filling before closing, mold assemblies for cast molding ophthalmic lenses, including contact lenses.

BACKGROUND

Ophthalmic lenses, such as contact lenses, made from polymeric materials, can be formed in molds comprising pairs of mold halves, i.e. a female mold half and a complementary male mold half. Typically, the polymerizable material is inserted into the female mold half and the male mold half is then brought together with the female mold half, producing a closed, filled mold assembly. In commercial scale ophthalmic lens production methods, a plurality of filled mold assemblies can be produced, such that a plurality of lenses can be formed simultaneously. In known methods and apparatus for bringing together the mold halves and forming a closed filled mold assembly, the position of the mold halves relative to one another is what is commonly used in order to verify that the two mold halves are acceptably closed. The relative position of the mold halves can, for example, be determined by sensing the distance between the mold halves or by bringing the mold halves to predetermined positions relative to each other, where the predetermined positions have previously been determined to correspond to positions where the mold assembly is known to be fully closed.

A rapid mold closure method is needed to support high-throughput manufacturing lines. It has been found, however, that if two mold halves are brought together at a too rapid velocity, imperfections can frequently occur in the final lens cast molded in the molds. For example, when the convex mold surface of a male mold half impacts a polymerizable composition present in the concave mold surface of a female mold half and the impact occurs too quickly, splashing of the polymerizable composition can occur, bubbles can be introduced into the lens-shaped cavity, and bubbles can be introduced to the polymerizable composition. Often, these bubbles will remain during the curing process, creating a bubble defect or a void in the lens body. This is particularly problematic with polymerizable compositions for forming silicone hydrogel contact lenses because they have been found to have a particular tendency to form bubbles when impacted. It has been found, however, that when the mold halves are moved and brought into contact with each other at too slow a velocity, the polymerizable composition can spread outwards on the male mold half, resulting in an inadequate volume of polymerizable composition remaining in the female mold half. The inadequate volume can cause a void and hence an incomplete lens to be formed. Closing the mold halves slowly is also in conflict with the desirability of completing the closure process as rapidly as possible.

SUMMARY

As described herein, the present disclosure provides apparatus for manufacturing contact lenses, and methods of manufacturing contact lenses, including the use of the apparatus in the methods of manufacturing contact lenses.

In a first aspect, the present disclosure provides a method of manufacturing an ophthalmic lens. The method comprises: providing a pair of mold halves consisting of a male mold half having a convex mold surface, and a complementary female mold half having a concave mold surface, wherein the female mold half retains a polymerizable composition for forming an ophthalmic lens between the concave and convex mold surfaces; moving one of the mold halves toward the other mold half, e.g. at an engaging velocity, until the convex mold surface of the male mold half contacts the polymerizable composition retained in the female mold half; contacting a surface of the male mold half with a surface of the female mold half, by applying a force to bring together the male mold half and the female mold half, e.g. in a contacting stage; measuring the force applied during the contacting step; and determining that the mold halves have formed a closed mold assembly, e.g., are acceptably closed, when the force is greater than or equal to a predetermined threshold force. The male mold half and the female mold half can be brought together in the contacting stage of the contacting step at a contacting velocity. The contacting velocity can be different from the engaging velocity. Alternatively, the contacting velocity can be the same as the engaging velocity. The method can further comprise measuring a moving force during the moving step. For example, the method can further comprise applying and measuring a moving force to carry out the moving of the one mold half toward the other. The engaging velocity, the contacting velocity, or both, can be predetermined based on a previously measured force(s) applied to bring together a different pair of mold halves, for example a second or test pair of mold halves. The contacting velocity can be predetermined based on a previously measured force applied to bring together a different pair of mold halves, for example, a second or test pair of mold halves. The moving step optionally includes an approaching stage, comprising bringing one of the mold halves to within a predetermined approaching distance relative to the position of the other mold half; and a subsequent meeting stage, comprising bringing one of the mold halves to a position where the male mold half directly contacts polymerizable composition contained in the female mold half. The predetermined approaching distance can be based on a previously measured force in a different pair of mold halves, for example, a second or test pair of mold halves.

A second aspect the present disclosure provides a mold closing apparatus suitable for closing one or more ophthalmic lens molds. The apparatus can comprise: an anvil for receiving a female mold half; a retainer for retaining the anvil in a fixed lateral position; a force sensor in operative communication with the anvil for measuring a force applied to a female mold half received in the anvil; a holder for holding and positioning a male mold half that is complementary to the female mold half; and a controller for controlling a velocity of movement of the holder and for determining when a measured force applied to bring together a surface of the female mold half received in the anvil and a surface of the complementary male mold half, is greater than or equal to a predetermined threshold force. The controller can control the velocity of the holder based on a predetermined velocity, based on a predetermined threshold force, based on a force measured by the force sensor, or based on any combination thereof. The controller can be configured to maintain the contacting velocity at a substantially constant rate for at least 80% of the duration of the contacting stage, for example, by increasing the force applied. The controller can control a dwell time based on a predetermined dwell time, based on a predetermined force, or based on a force measured by the force sensor. The anvil can be unrestrained from moving in a vertical direction. The mold closing apparatus can comprise an apparatus for closing a plurality of ophthalmic lens molds and can comprise a plurality of anvils and a respective plurality of force sensors. The apparatus for closing a plurality of ophthalmic lens molds can be an apparatus wherein each of a plurality of anvils is in operative communication with a separate, respective one of the force sensors.

The method of the first aspect of the disclosure can, for example, be performed using the apparatus of the second aspect of the disclosure. Similarly, the apparatus of the second aspect of the disclosure is suitable for performing the method of the first aspect of the disclosure.

BRIEF DESCRIPTION OF THE DRAWINGS

FIG. 1 is a schematic cross-sectional view of an exemplary mold closing apparatus according to the disclosure.

DESCRIPTION

In a first aspect, the present disclosure provides a method of manufacturing an ophthalmic lens. The method comprises: providing a pair of mold halves consisting of a male mold half having a convex mold surface, and a complementary female mold half having a concave mold surface, wherein the female mold half retains a polymerizable composition for forming an ophthalmic lens between the concave and convex mold surfaces; moving one of the mold halves toward the other mold half, e.g. at an engaging velocity, until the convex mold surface of the male mold half contacts the polymerizable composition retained in the female mold half; contacting a surface of the male mold half with a surface of the female mold half, by applying a force to bring together the male mold half and the female mold half, e.g. in a contacting stage; measuring the force applied during the contacting step; and determining that the mold halves have formed a closed mold assembly, e.g., are acceptably closed, when the force is greater than or equal to a predetermined threshold force. The male mold half and the female mold half can be brought together in the contacting stage of the contacting step at a contacting velocity. The contacting velocity can be different from the engaging velocity. Alternatively, the contacting velocity can be the same as the engaging velocity. The method can further comprise measuring a moving force during the moving step. For example, the method can further comprise applying and measuring a moving force to carry out the moving of the one mold half toward the other. The engaging velocity, the contacting velocity, or both, can be predetermined based on a previously measured force(s) applied to bring together a different pair of mold halves, for example a second or test pair of mold halves. The contacting velocity can be predetermined based on a previously measured force applied to bring together a different pair of mold halves, for example, a second or test pair of mold halves. The moving step optionally includes an approaching stage, comprising bringing one of the mold halves to within a predetermined approaching distance relative to the position of the other mold half; and a subsequent meeting stage, comprising bringing one of the mold halves to a position where the male mold half directly contacts polymerizable composition contained in the female mold half. The predetermined approaching distance can be based on a previously measured force in a different pair of mold halves, for example, a second or test pair of mold halves.

The method of manufacturing the ophthalmic lens can be a method as described in any preceding paragraph or succeeding paragraph or any combination of preceding and succeeding paragraphs, wherein at least one of the male mold half and the female mold half are in operative communication with a force sensor during the bringing together of the mold surfaces. For example, at least one of the male mold half and the female mold half can be in operative communication with a force sensor during the contacting stage. The method can further comprise the steps of positioning at least one of the male mold half and the female mold half in operative communication with the force sensor before or during the moving step. The method can further comprise inserting the polymerizable composition into the female mold half before the providing step. The positioning can comprise positioning at least one of the male mold half and the female mold half in an anvil that is in communication with the force sensor.

The method of manufacturing the ophthalmic lens can be a method as described in any preceding paragraph or succeeding paragraph or any combination of preceding and succeeding paragraphs, wherein the velocity at which the male mold half moves toward the female mold half during the contacting, for example during a meeting stage, during a contacting stage, or during both, is from about 0.5 mm/s to about 1.5 mm/s. The contacting velocity can be, for example, from 0.5 millimeters per second to 1.5 millimeters per second. The engaging velocity can be less than or equal to the contacting velocity. The engaging velocity can be substantially equal to the contacting velocity. The engaging velocity can be substantially constant for at least 80% of the duration of the meeting stage of the moving step. The contacting velocity can be substantially constant for at least 80% of the duration of the contacting stage.

The method of manufacturing the ophthalmic lens can be a method as described in any preceding paragraph or succeeding paragraph or any combination of preceding and succeeding paragraphs, optionally further comprising a dwelling stage that includes maintaining the application of force to the closed mold assembly for a predetermined period of time. For example, the contacting, the contacting step, or the engaging step can further comprise a dwelling stage that comprises maintaining the force to bring together the male mold half and the female mold half, for a predetermined period of time. The measuring step can further comprise determining that the force used to maintain the male mold half and the female mold half together during the dwelling stage, is greater than or equal to a predetermined threshold dwelling stage force. The predetermined threshold dwelling stage force can be, for example, 75 Newtons. The dwelling stage can further comprise a step of welding together the male mold half and the female mold half.

The method of manufacturing the ophthalmic lens can be a method as described in any preceding paragraph or succeeding paragraph or any combination of preceding and succeeding paragraphs, optionally further comprising a releasing stage that includes releasing the applied force and directing a stream of gas toward and past the mold halves. For example, the contacting, the contacting step, or the engaging step can comprise a releasing stage that comprises releasing the force. Optionally, after releasing the force, the contacting step can further comprise sending a stream of gas, for example, compressed air, toward and past the mold halves. The stream of gas can be sent toward and past the mold halves during, or immediately following, or both during and immediately following, the releasing stage. Alternatively or additionally, another method can be used for reducing the tendency of one or both of the mold halves to stick to one or more parts of the mold closing apparatus during pressure release.

The method of manufacturing the ophthalmic lens can be a method as described in any preceding paragraph or succeeding paragraph or any combination of preceding and succeeding paragraphs, further comprising a step of setting a velocity of movement of one or more of the mold parts of the pair in response to the measured force. The velocity set in response to the measured force can comprise the engaging velocity, the contacting velocity, or a combination thereof. The velocity set in response to the measured force can be the contacting velocity. The method of the present invention can further comprise a step of setting the predetermined approaching distance in response to the measured force. For example, the predetermined approaching distance can be set based on the measurement of a force corresponding to a determination of direct contact of the male mold half with the polymerizable composition retained in the female mold half, or based on the measurement of a force corresponding to a determination that the pair of mold halves are acceptably closed.

The method of manufacturing the ophthalmic lens can be a method as described in any preceding paragraph or succeeding paragraph or any combination of preceding and succeeding paragraphs, further comprising one or more of the steps of: curing the polymerizable composition in the pair of acceptably closed mold halves, to form a polymeric lens body; demolding and delensing the cured mold halves to release the polymeric lens body from both halves of the pair; optionally washing, extracting, hydrating, or any combination thereof, the released polymeric lens body; placing the released polymeric lens body in a contact lens package; sealing the filled package; and sterilizing the sealed package to form a finished contact lens package.

The method of manufacturing the ophthalmic lens can be a method as described in any preceding paragraph or succeeding paragraph or any combination of preceding and succeeding paragraphs, wherein, during the contacting step, a plurality of complementary mold half pairs are respectively brought into contact with each other, wherein an average of the forces measured between each of the plurality of mold halves is calculated, and wherein the determining step comprises determining that the plurality of pairs of mold halves are acceptably closed when the average of the forces measured is determined to be greater than or equal to a predetermined threshold average force. At least one mold half of each pair of the plurality of pairs can be in operative communication with a respective force sensor and the average of the forces measured can be used to determine that the plurality of pairs of mold halves are acceptably closed. Each mold half in communication with a sensor can be positioned in a respective anvil, and each of the respective anvils can be in communication with a respective force sensor.

The method of manufacturing the ophthalmic lens can be a method as described in any preceding paragraph or succeeding paragraph or any combination of preceding and succeeding paragraphs, wherein the method provides good consistency in contact lens diameters such that a variance in an average contact lens diameter measured for a plurality of finished contact lenses made in accordance with the method is at least 5% lower than the variance in average contact lens diameters made by a similar method but that does not include a determining step.

A second aspect the present disclosure provides a mold closing apparatus suitable for closing one or more ophthalmic lens molds. The apparatus can comprise: an anvil for receiving a female mold half; a retainer for retaining the anvil in a fixed lateral position; a force sensor in operative communication with the anvil for measuring a force applied to a female mold half received in the anvil; a holder for holding and positioning a male mold half that is complementary to the female mold half; and a controller for controlling a velocity of movement of the holder and for determining when a measured force applied to bring together a surface of the female mold half received in the anvil and a surface of the complementary male mold half, is greater than or equal to a predetermined threshold force. The controller can control the velocity of the holder based on a predetermined velocity, based on a predetermined threshold force, based on a force measured by the force sensor, or based on any combination thereof. The controller can be configured to maintain the contacting velocity at a substantially constant rate for at least 80% of the duration of the contacting stage, for example, by increasing the force applied. The controller can control a dwell time based on a predetermined dwell time, based on a predetermined force, or based on a force measured by the force sensor. The anvil can be unrestrained from moving in a vertical direction. The mold closing apparatus can comprise an apparatus for closing a plurality of ophthalmic lens molds and can comprise a plurality of anvils and a respective plurality of force sensors. The apparatus for closing a plurality of ophthalmic lens molds can be an apparatus wherein each of a plurality of anvils is in operative communication with a separate, respective one of the force sensors.

The method of the first aspect of the disclosure can, for example, be performed using the apparatus of the second aspect of the disclosure. Similarly, the apparatus of the second aspect of the disclosure is suitable for performing the method of the first aspect of the disclosure.

It has been found that the force applied between a pair of mold halves as the surfaces of the mold halves come into contact during the mold closing process can be predictive of whether or not the mold halves are acceptably closed, and measurement of the force in accordance with the present disclosure enables determination of whether or not the mold halves are acceptably closed with a high level of accuracy. Failing to acceptably close a mold assembly prior to curing has been found to produce variability in the diameter of the cured lens body relative to lenses produced similarly in other mold assemblies. Determining whether or not a mold assembly has been acceptably closed based on force measurement taken during the closing process has been found to substantially reduce this variability in cured lens diameters. Additionally, it has been found that controlling the velocity, the force, or both the force and velocity at which a male mold half contacts the female mold half, or at which the male mold half contacts a polymerizable composition contained in a female mold half, can reduce the number of defective lenses produced. As previously stated, the present disclosure is directed to both methods and apparatus that determine whether or not a mold assembly has been acceptably closed and that base the determination on a force measured to bring the mold halves together during the mold closing process.

In the method of the disclosure, a velocity at which the male mold half and the female mold half are brought together during the moving step, or during an engaging stage, or during the contacting step, including a contacting stage of the contacting step or a closing stage of the contacting step, or any combination thereof, can be pre-set. Alternatively or in addition, the velocity at which the male mold half and the female mold half are brought together during the moving step, including the meeting stage of the moving step, or during an engagement stage, or during the contacting step, including the contacting stage of the contacting step or the closing stage of the contacting step, or any combination thereof, can be varied in response to a measured force applied to bring the pair of mold halves together during the moving step or the contacting step. For example, when the force applied to bring together the mold halves in the contacting stage is found to approach or be equal to a predetermined threshold force, for example, is found to be within 25% of the predetermined force, the velocity at which the mold halves are brought together can be slowed.

The female mold half can be in operative communication with a force sensor while the complementary mold halves are brought together to form a closed mold assembly. The force sensor can measure the force applied to bring the two mold halves together as the mold halves are brought together. The force sensor can measure a second force applied when a surface of the male mold half directly contacts a surface of the female mold half, as opposed to contacting only polymerizable lens material. In addition, the force sensor can measure a force applied when the male mold half directly contacts polymerizable composition contained in the female mold half (i.e., before a surface of the male mold half comes into direct contact with a surface of the female mold half). The method of the disclosure optionally further comprises a step of positioning the female mold half so it is in operative communication with the force sensor. The female mold half can be positioned on an anvil as the male and female mold halves are brought together, i.e. during the moving or contacting steps of the disclosed method. The anvil can be linked to, for example, positioned on, resting on, and/or otherwise in contact with, the force sensor. The step of positioning the female mold half to be in operative communication with the force sensor can comprise positioning the female mold half on the anvil.

The method of the disclosure optionally further comprises a step of inserting the polymerizable composition into the female mold half. The inserting the polymerizable composition can, for example, comprise injecting the polymerizable composition into the female mold half. The female mold half can be positioned in communication with a force sensor prior to the inserting of the polymerizable composition. For example, the female mold half can be positioned on an anvil during the inserting of the polymerizable composition into the female mold half.

The step of moving at least one mold half of the pair can comprise using an approaching stage, or a meeting stage, or both, wherein one of the mold halves is brought to within a predetermined approaching distance relative to the position of the other mold half. The predetermined approaching distance can be set to a distance at which the male mold half has yet to come into contact with polymerizable composition present in the female mold half. The predetermined approaching distance can be set to a distance at which the male mold half is close to coming into contact with polymerizable composition present in the female mold half while not coming into contact with the polymerizable composition. The predetermined approaching distance can be a distance in the range of from about 0.8 mm to about 2.0 mm, for example, from about 1.0 mm to about 1.5 mm. The mold halves can be brought together rapidly during the approaching stage, for example, at an approaching velocity in excess of about 2 mm/s, in excess of about 25 mm/s, in excess of about 50 mm/s, or in excess of about 100 mm/s. The velocity at which the mold halves are brought together during the moving step, or during an approaching stage, or during a meeting stage, or during an engagement stage, or any combination thereof, can decrease towards the end of the step or stage. For example, there can be a gradual deceleration as the predetermined approaching distance approaches. The step of moving at least one mold half of the pair can comprise using a meeting stage wherein one of the mold halves is brought to a position where the male mold half directly contacts polymerizable composition contained in the female mold half. The meeting stage can commence once the predetermined approaching distance is reached. The mold halves can be brought together at the engaging velocity in the meeting stage. The engaging velocity can be slower than the approaching velocity.

The steps of moving and contacting can comprise an engaging stage in which the male and female mold halves are moved closer together until a predetermined force is measured. The engaging stage can bridge the moving and contacting steps. The engaging stage can span the meeting stage of the moving step and the contacting stage of the contacting step. The engaging stage can, for example, commence when the mold halves reach the predetermined approaching distance and end when it is determined that the pair of mold halves are acceptably closed. The pair of mold halves can be moved or brought together during the engaging stage at a velocity that is in the range of from about 0.5 mm/s to about 2.0 mm/s, such as, for example, from about 0.6 mm/s to about 1.5 mm/s, or from about 0.7 mm/s to about 1.2 mm/s. The velocity at which the mold halves are moved or brought together during the engaging stage can be within those ranges at least up until the point where the male mold half first comes into contact with the polymerizable composition in the female mold half. It has been found that when the engaging velocity, i.e. the velocity at which the male mold half first contacts the polymerizable composition in the female mold half, is in that range, for example, at an approach speed of about 1.0 mm/s, the engaging velocity can be slow enough to prevent splashing of the polymerizable monomer and/or prevent the formation of bubbles upon impact of the male mold half with the polymerizable composition. Such a speed, however, can be rapid enough to prevent problems that might occur at slower speeds due to wetting of the molding surface of the male mold half by the polymerizable composition. The velocity at which the pair of mold halves move together during the engaging stage can be substantially constant, for example, it can vary by no more than 10% during the majority of the engaging stage, for example, for at least 80% of the duration of the engaging stage. The force applied to bring the pair of mold halves together during the engaging stage can be made to slightly increase over time in order to keep the velocity substantially constant during a substantial part of the engaging stage. For example, during a first phase of the engaging stage, before the male mold contacts the polymerizable composition, the mold halves are not in contact with each other and thus there is no contact that would slow or prevent movement of the mold halves towards each other. Then, during a second phase, after the male mold half has come into contact with the polymerizable composition, the force applied can be increased as the surfaces of the mold halves approach one another in order to maintain a constant velocity at which the two mold halves move toward one another. The second phase can end when the force reaches the predetermined force. Alternatively, the engaging stage can enter a final phase as the force approaches a predetermined force, such as, when it is within 25% of the predetermined force. At that point, the rate of increase of the force can be adjusted to slow the velocity of one or both of the mold halves as the surfaces of the mold halves approach and then come into direct contact with one another.

Polymerizable compositions for forming ophthalmic lenses such as contact lenses, for example, silicone hydrogel contact lenses, are known in the art. Such compositions typically comprise one or more monomers and/or oligomers that polymerize upon curing of the composition. Curing typically occurs by exposure of the polymerizable composition to radiation, such as heat, light, or electron beam radiation. The polymerizable composition can also include one or more initiators to initiate curing reactions, one or more crosslinkers to provide cross linkages between polymer chains, and/or one or more catalysts, promoters, or cross-linking agents. The polymerizable compositions of the present disclosure can comprise one or more silicon-containing monomers or oligomers. The polymerizable compositions of the disclosure can produce a hydrogel on curing, including a silicone hydrogel. A hydrogel is a polymeric system, typically a cross linked polymeric system that is capable of containing water in an equilibrium state, for example, at least 10% water by weight, or at least 30% water by weight, based on the total weight of the polymerized lens material. A silicone hydrogel incorporates silicon-containing units in the polymeric system. Due to the tendency of polymerizable compositions comprising silicon-containing monomers or oligomers to form and retain air bubbles, the method and apparatus of the present disclosure has been found to be particularly useful for the closure of molds containing a polymerizable composition for forming a silicon hydrogel contact lens. Polymerizable compositions for forming a silicon hydrogel contact lens have been found to be especially prone to the formation of bubbles and other imperfections when the impact speed between a male mold half and the polymerizable composition in the female mold half is rapid, for example, when the velocity is above 1.5 mm/s.

The moving, contacting, or both steps, can involve moving the male mold half towards and into contact with the female mold half. Alternatively, or in addition, the moving, contacting, or both steps, can involve moving the female mold half towards and into contact with the male mold half. In addition to the mold halves being brought together, i.e., towards one another, during the method of the disclosure, the entire mold assembly, once formed, can also move through space during the method of the disclosure. The method of the disclosure can take place while the mold assembly is being transported through a contact lens production facility.

The measurement of a force applied between directly contacting surfaces of the mold halves, is used in determining if the pair of mold halves of a mold assembly is acceptably closed. The measured force is compared to a predetermined force, i.e., compared to a predetermined threshold force. The predetermined threshold force can be set, for example, in a calibration step. For example, the predetermined threshold force can be determined by visually assessing when for a second pair of molds halves of a given type, the female half of which is filled with a polymerizable composition of a given type, are acceptably closed, measuring the applied force at that point, and setting the predetermined threshold force accordingly. It has been found that a typical force required to acceptably close a pair of mold halves filled with an appropriate amount of polymerizable composition to form an ophthalmic lens, for example, a contact lens, especially a silicone hydrogel contact lens, can be in the range of from about 10 N to 40 N, for example, in the range of from about 15 N to 30 N. Thus, the predetermined threshold force of the method of the disclosure can be set to be at a level within those ranges, for example, at about 20 N.

The force measurement can be used in determining the contacting velocity used during the contacting step. The measured force can be compared to a predetermined force, i.e., a predetermined threshold force.

The step of contacting, in the method of the disclosure, optionally further comprises a closing stage in which the force applied between the mold halves is increased from the predetermined threshold force to above a further, higher predetermined threshold level. The further, higher predetermined threshold level can be the predetermined dwelling threshold level or can be a different level. The distance over which the mold halves are transported during the closing stage can be small or negligible. When used, the primary function of the closing stage is to increase the pressure applied between the mold surfaces when they are already in direct contact with one another. The closing velocity at which the mold halves of a pair are brought further together during the closing stage, if at all, is typically less than the engaging velocity at which the mold halves move toward each other, relatively, during the moving step. The closing velocity at which the mold halves of a pair are brought further together during the closing stage, if at all, is typically less than the contacting velocity at which the mold halves move toward each other, relatively, during the contacting stage of the contacting step. If an engaging stage is included, the closing velocity can be less than the engaging velocity. The engaging velocity can be set based on a measured force. The closing velocity can be set based on a measured force.

The method of the disclosure optionally further comprises a dwelling stage in which the force measured between the directly contacting pair of male and female mold halves is maintained for a predetermined dwelling time. The force can be greater than or equal to a predetermined threshold dwelling stage force. The dwelling stage can comprise maintaining the measured force at a force greater than or equal to the predetermined dwelling stage force, and for the predetermined dwelling time. The length of time of the dwelling stage can be at least 0.05 s, for example, from about 0.05 s to about 0.5 s, from about 0.10 s to about 0.30 s, or from about 0.15 s to about 0.25 s. It has been found that a dwelling time of at least about 0.1 s, for example, of at least about 0.2 s, is sufficient to enable the polymerizable composition to become stabilized in the mold assembly. The dwelling time can be set based on a measured force.

The optional further, higher predetermined threshold force, or the optional predetermined threshold dwelling stage force, or both, can be, for example, 60 N, 75 N, 90 N, or 100 N. It has been found that applying a force of at least 60 N or of at least 75 N produces an acceptably closed mold assembly, and can ensure that the polymerizable composition is properly distributed in the closed mold. Where a plurality of molds are closed in the same method or apparatus, the further, higher predetermined threshold force, or the optional predetermined threshold dwelling stage force, or both, for any one pair of mold halves, can be compared to the average force measured for the plurality of mold pairs. It has been found that when the average force measured between a plurality of molds is at least 90 N, or at least 100 N, the individual measured force for any individual mold pair is typically at least 60 N or 75 N.

The method of the disclosure optionally can further comprise a releasing stage in which the force between the directly contacting pair of mold halves of the mold assembly is released. Concurrently with or subsequent to the releasing, the method can comprise sending a stream of gas, such as air, for example, toward and past the pair of mold halves. Sending air toward and past the pair of mold halves during or immediately following the pressure release stage has been found to assist in maintaining the mold assembly in a closed state. It has been found that sending gas toward and past the mold assembly during or immediately following the step of releasing the force between the mold halves can reduce the tendency for the mold halves to stick to parts of the mold closing apparatus during or immediately following the release of pressure. Reducing the tendency for such sticking is important because sticking can result in the mold assembly inadvertently reopening following closure.

The method can further comprise a disengaging stage in which the holder releases its hold on at least one of the mold halves, for example the male mold half, or on both mold halves, of the mold assembly. For example, prior to or during a releasing stage of the method, the releasing stage can comprise causing the holder to release its hold on the male mold half. Where the holder holds the male mold half or both halves using suction, the suction can be discontinued in the disengaging stage, for example, prior to or during the releasing stage.

When the method is performed in a mold closing apparatus that comprises a holder for a single mold half or a holder for a plurality of mold halves, or a plurality of holders for holding a plurality of mold halves, the holder(s) can move away from the closed mold assembly in an optional disconnecting step. For example, the disconnecting step can disconnect a single holder for a single mold half, or disconnect a single holder for a plurality of male mold halves, or disconnect a plurality of holders for a plurality of single male mold halves. The disconnecting step can follow the disengaging stage and releasing stage. The disconnecting step can comprise a retracting stage, such that the holder retracts from the male mold half or the male mold halves. The holder(s) can move slowly away from the mold(s), for example, at a retracting velocity of about 20 mm/s or less, for example, at a velocity of about 5 mm/s or less, or of about 2 mm/s or less, in the retracting stage. The disconnecting step can optionally comprise a departing stage, wherein the one or more holders move away from the one or more molds rapidly, for example, at a departing velocity of 20 mm/s or more, for example, at about 50 mm/s or more, or at about 100 mm/s or more. It has been found that using an initially slow retracting velocity wherein the velocity at which the holder moves away from the mold is a velocity of less than 20 mm/s, or less than 1 mm/s, can reduce unwanted disturbance of the filled and closed mold assemblies. Subsequent to an initial slow retracting velocity, the holder can move away from the mold more rapidly in the departing stage without risk of disturbing the filled and closed mold assemblies. In a particular example, gas, such as compressed air, can be sent, for example, blown toward and past the filled and closed mold assemblies. The sending of air toward and past the filled and closed mold assemblies during the disconnection step has been found to maintain the filled and closed mold assemblies in their closed state. It has also been found that sending gas toward and past the molds during the disconnecting step can reduce the tendency for the mold halves of the filled and closed mold assemblies to stick to parts of the mold closing apparatus, such as the holder or the anvil, during disengaging and retracting the holders, which sticking might otherwise result in the filled and closed mold assemblies inadvertently reopening.

Following the performance of the mold closing method using a mold closing apparatus, an optional transferring step in which the filled and closed mold assembly is transferred away from the mold closing apparatus, can be conducted. For example, the filled and closed mold assembly can be transferred away from the mold closing apparatus prior to conducting a curing step to polymerize the polymerizable composition and form a polymerized lens body in the cavity of the mold assembly.

The method of the present disclosure can optionally comprise a calibrating step. In the calibrating step, the parameters used in the method of the disclosure, including the predetermined threshold force, the further, higher predetermined threshold force, the predetermined engaging velocity, the predetermined contacting velocity, the predetermined threshold dwelling stage force, the predetermined threshold dwelling stage duration, and particularly the predetermined approaching distance, can be determined, for example, to reflect variables such as the nature of the mold, e.g., size, shape, and/or material of the mold, and the nature of the polymerizable composition. The calibrating step can be conducted prior to the moving step. The calibrating step can be performed periodically during a single manufacturing run and/or when any of the variables of the molding process are changed. The calibrating step can comprise ascertaining the position of one or both of the mold halves when a force is measured, for example, when a force measurement is taken and one or more other method parameters is set or reset based on the value of the measured force. For example, the position at which a predetermined distance between a pair of mold halves is deemed to have been reached during the approaching stage can be determined during the calibrating step. The position determined during the calibrating step can then be used to set or reset predetermined values for a subsequent method. For example, based upon the position determined during the calibrating step, the predetermined threshold force or the further, higher predetermined threshold force can be set or reset. The calibrating stage can provide a feedback mechanism by which the method or apparatus of the disclosure can adjust the operating parameters such that an acceptable level of performance is maintained, for example, despite changes in variables such as the nature of the mold.

A plurality of pairs of mold halves (for example 4, 8, or 16 molds) can be closed simultaneously in the method of the disclosure and/or in the apparatus of the disclosure. The apparatus can be configured to close a plurality of pairs of mold halves simultaneously. When there is more than one pair of mold halves, the force applied to each respective mold pair, for example, to bring each respective pair of mold halves together, can be measured. The average of the individual second forces measured can then be determined. A threshold force, such as the predetermined threshold force, can, for example, be deemed to have been reached when an average of the measured forces is determined to have reached the threshold force. The plurality of pairs of mold halves can be determined to be acceptably closed when the average measured force is determined to have reached the predetermined threshold force. Thus, the first aspect of the disclosure can further provide a method of manufacturing a plurality of ophthalmic lenses by closing a plurality of mold assemblies, each comprising a pair of mold halves consisting of a male mold half and a complementary female mold half. The female mold halves can each contain a polymerizable composition for forming an ophthalmic lens. The manufacturing method can comprise providing a plurality of pairs of mold halves, each pair of mold halves consisting of a single male mold half having a convex mold surface, and a single complementary female mold half having a concave mold surface. Each of the single female mold halves can contain or retain a polymerizable composition for forming an ophthalmic lens in the concave mold surface. The manufacturing method can comprise moving at least one single mold half of each of the plurality of pairs of mold halves toward the complementary other single mold half of the pair, wherein the moving occurs at a velocity, until the convex mold surface of the male mold half of each pair contacts the polymerizable composition in the respective female mold half. In so doing, a force is applied to bring the mold halves of each pair towards each other, that is, to bring each male mold half toward a respective female mold half with which the male mold half is paired. The manufacturing method can then comprise bringing a surface of the male mold half of each pair of mold halves into direct contact with a surface of the respective complementary female mold half, thereby applying force to bring together the male mold half and the female mold half of each pair. The manufacturing method can then comprise measuring the force applied to each of at least two of the plurality of mold pairs, for example, the forces respectively applied to three or more mold pairs, or the forces applied to each of the mold pairs of the plurality, during the contacting step. The manufacturing method can then comprise determining that each of the pairs of mold halves is acceptably closed when an average of the measured forces is greater than or equal to a predetermined threshold force. As soon as such a determination is made, each of the closed pairs of mold halves can be said to have formed an acceptably filled and closed mold assembly. More than one, for example, each of a plurality of pairs of mold halves can be in operative communication with a separate, respective force sensor, for example, each female mold half can be in operative communication with a separate, respective force sensor. For the avoidance of doubt, references to the measured force mentioned above can equally well be applied mutatis mutandis to the average measured forces applied to more than one of a plurality of pairs of mold halves.

The manufacturing method of the first aspect of the disclosure can be performed using a mold closing apparatus, such as the mold closing apparatus of the second aspect of the disclosure. The mold closing apparatus can include an anvil for receiving a female mold half. When a plurality of pairs of mold halves are closed in the method of the disclosure, a separate anvil can be provided for each female mold half of the plurality of pairs of mold halves. During the method of the disclosure, the anvil(s) can be retained in a fixed lateral position, for example, using a retainer. For example, a plurality of separate anvils can be positioned in a single plate, where the single plate serves as the retainer. The anvil(s) can be unrestrained from moving in a vertical direction by the retainer. The retainer can comprise a plurality of apertures for receiving a plurality of anvils. The force applied to move the mold halves towards one another can be measured by a force sensor. Where a plurality of mold halves are closed in the method of the disclosure, a plurality of force sensors can be present, for example, a single force sensor for each respective pair of mold halves. The force sensor(s) can, for example, be in communication with the anvil(s), if present. An apparatus for closing a plurality of ophthalmic lens molds in according to the present disclosure can comprise a plurality of anvils and a respective plurality of force sensors, wherein, optionally, each of the plurality of anvils is in operative communication with a separate, respective one of the force sensors. Each of the anvils of the apparatus can rest directly on a single respective force sensor. For example, when a plurality of separate anvils are positioned in a single plate, each of the separate anvils can be in operative communication with a separate force sensor, or a subset of the plurality of separate anvils can each be in operative communication with a separate force sensor, or at least one of the plurality of separate anvils can be in operative communication with a force sensor.

The male mold half of each pair of mold halves can be held and positioned using a holder, during the method of the disclosure. The holder can comprise a single holder configured to hold a plurality of male mold halves. The holder can comprise a plurality of holders, each configured to hold a single male mold half. The holder can comprise a single holder configured to hold a single male mold half. The mold closing apparatus of the second aspect of the disclosure can comprise a holder for holding and/or positioning the male mold half or a plurality of male mold halves. The holder can, for example, hold the male mold half or halves using suction. The movement of the holder can be controlled in response to the measured force(s) applied to each pair of mold halves. The movement of the holder can, for example, be controlled by a controller. The controller can control the movement of the holder in response to measurements of the force applied to the mold halves of each mold pair, for example, the force measurements determined by the force sensor(s). The controller can control the velocity of the holder based on a predetermined velocity, based on a predetermined threshold force, based on a force measured by the force sensor, or any combination thereof. The controller can control a dwell time, based a predetermined dwell time, based on a predetermined force, or based on a force measured by the force sensor.

FIG. 1 is a schematic cross-sectional view of an example of a mold closing apparatus 13 according to the second aspect of the disclosure. Mold closing apparatus 13 comprises anvils 1 for receiving two female mold halves 2, a single retainer 3 for retaining anvils 1 in a fixed lateral position, and two force sensors 4, each in direct communication with a respective one of anvils 1. Two male mold halves 5 are held in a single holder 6 that is configured for holding and positioning male mold halves 5 during a mold closure process. Each of two female mold halves 2 includes a concave molding surface 8 and each of male mold halves 5 includes a convex molding surface 9. Mold closing apparatus 13 further comprises a single controller 10 for controlling the movement of holder 6. Controller 10 can be configured to control the rate of movement of holder 6 in response to the forces measured by force sensors 4, such as a first force or a second force, as well as to control the rate in response to other predetermined parameters and variables. A nozzle 11 for blowing air between the complementary mold halves of each pair, once closed, is also provided. The apparatus can also include a single injector or a plurality of injectors (not shown) for injecting a polymerizable composition 7 into each of female mold halves 2. As illustrated in FIG. 1, retainer 3 comprises two through bores, and anvils 1 are positioned, respectively, in the through bores. The through bores can prevent each of anvils 1 from moving in a lateral direction while allowing each of anvils 1 to move freely in a vertical direction. As such, forces applied to each of anvils 1 in a vertical direction are transferred to each corresponding force sensor 4 on which anvils 1 respectively rest. Retainer 3 and sensors 4 are mounted on a single block 12.

In a manufacturing method according to the first aspect of the disclosure, each of female mold halves 2 of FIG. 1 are positioned on a respective anvil 1 and a polymerizable composition 7 for forming a polymeric ophthalmic lens is poured, applied, injected, or otherwise put into the female mold half to be in contact with concave molding surface 8 of each. Female mold halves 2 form receptacles for polymerizable composition 7. At the same time, in an approaching stage, holder 6 collects or holds male mold halves 5 and positions each of them above a single corresponding female mold half 2 with convex molding surface 9 of each of male mold halves 5 orientated towards a respective one of concave molding surfaces 8 of female mold halves 2. Once holder 6 reaches a position at which at least one of the pairs of mold halves are at a predetermined distance from each other, e.g., a male mold half 5 and corresponding female mold half 2 are at a predetermined distance A from one another, an engaging stage is entered or commenced. During the engaging stage, controller 10 ensures that the first engaging velocity at which at least one male mold half 5 and its complementary female mold half 2 are moved toward one another is held at a slow, constant speed, e.g., of about 0.6 mm/s. Moving towards one another can constitute moving both complementary mold halves or moving just one. After the male mold half has made contact with polymerizable composition 7 present in the complementary female mold half, the contacting step begins and the surface of the male mold half is brought into contact with the surface of the complementary female mold half at a second contacting velocity. When the second contacting velocity is substantially the same as the first engaging velocity, the force required to maintain each of the mold halves moving at a substantially constant velocity increases. During the contacting step, the individual force sensors measure the force applied to a pair of mold halves once the surfaces of the male mold half and female mold half are brought into direct contact with one another. As the average of the individual forces measured by sensors 4 approaches the predetermined threshold force, the controller determines when the average measured force is greater than or equal to the predetermined threshold force. Once such a determination is made, it indicates that all, or in the case shown, both, of the pairs of mold halves are acceptably closed. When the average measured force is close to the predetermined threshold second force, e.g., within 5 N or within 25% of the predetermined force, controller 10 can further adjust the velocity at which male mold halves 5 and female mold halves 2 are brought together, and the adjustment results in a third velocity. Once the average measured force is greater than or equal to the predetermined threshold force, e.g., 20 N, the engaging stage is complete and the method can enter a closing stage in which the force applied to bring the mold halves together, as applied by holder 6, is increased until the average force measured by sensors 4 reaches a further, higher predetermined threshold force, e.g., 100 N. The force can be maintained by holder 6 in a dwelling stage at or above the dwelling stage threshold force until a predetermined period of time, e.g., 0.2 s, has elapsed. The force applied by holder 6 to each of the pairs of mold halves can then be released in a releasing stage. Simultaneously, or subsequent to the releasing stage, holder 6 can release its hold on each of male mold halves 5 in a disengaging stage. Once pressure sensors 4 indicate that one or more of holders 6 is no longer applying any force to a pair of mold halves and holder 6 has released its hold on male mold halves 5, holder 6 can move away from the pairs of filled and closed mold halves in a disconnecting step. The disconnecting stage can include a retracting stage, during which holder 6 moves slowly, for example, at a velocity of 1 mm/s, away from male mold halves 5. The disconnecting step can be followed by a departing stage in which holder 6 moves away from male mold halves 5 more rapidly, e.g., at a velocity of 100 mm/s. During the releasing stage, or the disengaging stage, or the retracting stage, or during any combination of such stages, a jet of gas or air can be blown through nozzle 11 toward and across the plurality of closed mold halves to assist in freeing each of male mold halves 5 from holder 6 to prevent one or more of the plurality of mold halves from inadvertently reopening.

While the present invention has been described and illustrated with reference to particular embodiments, it will be appreciated by those of ordinary skill in the art that the invention lends itself to many different variations not specifically illustrated herein.

In the foregoing description, where integers or elements are mentioned which have known, obvious, or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient, or the like are optional and do not limit the scope of the independent claims. Moreover, it is to be understood that such optional integers or features, while of possible benefit in some embodiments of the invention, may not be desirable, and may therefore be absent, in other embodiments.

The invention claimed is:

1. A method of manufacturing an ophthalmic lens, the method comprising:
   providing a male mold half having a convex mold surface, and a complementary female mold half having a concave mold surface, wherein the female mold half retains a polymerizable composition for forming an ophthalmic lens between the convex mold surface and the concave mold surface;
   moving one of the mold halves toward the other mold half until the convex mold surface of the male mold half contacts the polymerizable composition retained in the female mold half;
   contacting a surface of the female mold half with a surface of the male mold half by applying a force to bring the male mold half and the female mold half together, wherein a velocity at which the male mold half is moved toward the female mold half during the contacting is predetermined based on a previously measured force applied to contact a different pair of mold halves with one another;
   measuring the force applied during the contacting; and
   determining that the mold halves have formed a closed mold assembly when the force is greater than or equal to a predetermined threshold force.

2. The method of claim 1, further comprising applying and measuring a moving force during the moving of the one mold half toward the other.

3. The method of claim 1, wherein at least one of the male mold half and the female mold half is in operative communication with a force sensor during the contacting.

4. The method of claim 3, further comprising positioning at least one of the male mold half and the female mold half in operative communication with the force sensor before or during the contacting.

5. The method of claim 4, wherein the positioning comprises positioning at least one of the male mold half and the female mold half in an anvil, wherein the anvil is in operative communication with the force sensor.

6. The method of claim 1, wherein the velocity at which the male mold half is moved toward the female mold half during the moving, during the contacting, or during both, is from about 0.5 mm/s to about 1.5 mm/s.

7. The method of claim 6, wherein the velocity at which the male mold half is moved toward the female mold half during the moving is substantially constant for at least 80% of the duration of the moving.

8. The method according to claim 1, comprising a dwelling stage that includes maintaining the application of the force to the closed mold assembly for a predetermined period of time.

9. The method of claim 8, wherein the measuring further comprises determining that the force applied during the dwelling stage is greater than or equal to a predetermined threshold dwelling stage force.

10. The method of claim 9, wherein the predetermined threshold dwelling stage force is about 75 N or more.

11. The method of claim 1, further comprising a releasing stage that includes releasing the applied force and directing a stream of gas toward and past the mold halves.

12. The method of claim 1, wherein the method further comprises:
curing the polymerizable composition in the closed mold assembly to form a polymeric lens body; demolding and delensing to release the polymeric lens body from both of the mold halves; optionally washing or extracting or hydrating, or any combination thereof, the released polymeric lens body; placing the released polymeric lens body in a contact lens package; sealing the filled package; and sterilizing the sealed package to form a finished contact lens package.

13. The method of claim 1, wherein the contacting comprises contacting a plurality of male mold halves with a respective plurality of complementary female mold halves, calculating an average of the forces measured to contact each of the plurality of mold pairs, and wherein the determining comprises determining that that the plurality of pairs of mold halves are acceptably closed when the average of the forces measured is determined to be greater than or equal to a predetermined threshold average force.

14. The method of claim 13, wherein at least one mold half of each of the plurality of pairs of mold halves is in communication with a separate force sensor and wherein the average of the forces measured is used to determine that the plurality of pairs of mold halves are acceptably closed.

15. The method of claim 14, wherein the at least one mold half of each of the plurality of pairs of mold halves is positioned in a separate, respective anvil, and each of the separate, respective anvils is in operative communication with a separate, respective force sensor.

16. The method of claim 13, wherein a variance in an average contact lens diameter of a plurality of finished contact lenses made in accordance with the method is at least 5% lower than a variance in average contact lens diameter of a second plurality of finished contact lenses made in accordance with substantially the same process but wherein that the process used to make the second plurality of finished contact lenses does not include a determining step.

17. A mold closing apparatus suitable for closing one or more contact lens molds, comprising:
an anvil for receiving a female mold half;
a retainer for retaining the anvil in a fixed lateral position;
a force sensor in operative communication with the anvil for measuring a force applied to a female mold half received in the anvil or to a polymerizable composition contained in a female mold half received in the anvil;
a holder for holding and positioning a male mold half that is complementary to the female mold half; and
a controller for controlling a velocity of movement of the holder, and for determining when a measured force applied to bring together a surface of a female mold half received in the anvil and a surface of a complementary male mold half held by the holder, is greater than or equal to a predetermined threshold force, wherein said velocity is predetermined based on the measured force.

18. The mold closing apparatus of claim 17, wherein the anvil is unrestrained from moving in a vertical direction.

19. The mold closing apparatus of claim 17, further comprising a plurality of anvils and a respective plurality of force sensors, wherein each of the plurality of anvils is in operative communication with a separate, respective one of the force sensors.

* * * * *